United States Patent
Galloni

(10) Patent No.: US 7,914,276 B2
(45) Date of Patent: Mar. 29, 2011

(54) VARIABLE-PITCH MOULDING UNITS AND MOULDING MACHINE

(75) Inventor: Bruno Galloni, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 545 days.

(21) Appl. No.: 11/994,933

(22) PCT Filed: Jul. 4, 2006

(86) PCT No.: PCT/FR2006/001588
§ 371 (c)(1),
(2), (4) Date: Apr. 18, 2008

(87) PCT Pub. No.: WO2007/006908
PCT Pub. Date: Jan. 18, 2007

(65) Prior Publication Data
US 2008/0220115 A1 Sep. 11, 2008

(30) Foreign Application Priority Data
Jul. 11, 2005 (FR) ...................................... 05 07388

(51) Int. Cl.
*B29C 49/36* (2006.01)
*B29C 49/56* (2006.01)
(52) U.S. Cl. ...................... 425/540; 425/451.4; 425/541
(58) Field of Classification Search .................. 425/522, 425/540, 541, 451.4, DIG. 5
See application file for complete search history.

(56) References Cited

U.S. PATENT DOCUMENTS

| | | | | |
|---|---|---|---|---|
| 4,233,010 A * | 11/1980 | Suzuki | .......................... | 425/540 |
| 4,313,720 A * | 2/1982 | Spurr | ............................ | 425/540 |
| 4,330,255 A * | 5/1982 | Suzuki | .......................... | 425/529 |
| 5,618,489 A * | 4/1997 | Weissmann | ................... | 425/540 |
| 6,805,548 B1 | 10/2004 | Evrard | | |
| 7,137,804 B2 | 11/2006 | Mue et al. | | |
| 7,708,549 B2 * | 5/2010 | Stoiber et al. | ................ | 425/540 |
| 7,766,645 B2 * | 8/2010 | Legallais | ...................... | 425/540 |
| 2004/0151797 A1 | 8/2004 | Mue et al. | | |

FOREIGN PATENT DOCUMENTS

FR 2 793 722 A1 11/2000
FR 2 825 659 A1 12/2002

* cited by examiner

*Primary Examiner* — Robert B Davis
(74) *Attorney, Agent, or Firm* — Sughrue Mion, PLLC

(57) ABSTRACT

An assembly including units for molding polymer materials, the units being arranged successively in a mobile line, each of the molding units including a mold, the mold including two parts mutually mobile about a pivot pin, the movement of the two parts relative to each other being produced upon opening and closing of the mold. The assembly includes rollers cooperating with a track, each of the rollers being connected by link rods to the two pivot pins of adjacent molding units, the path described by the rollers against the track and the path described by the pivot pins being urged to be brought closer together on a predetermined travel of the molding units, such that the distance between the pivot pins of the adjacent molding units is increased during the travel.

13 Claims, 4 Drawing Sheets

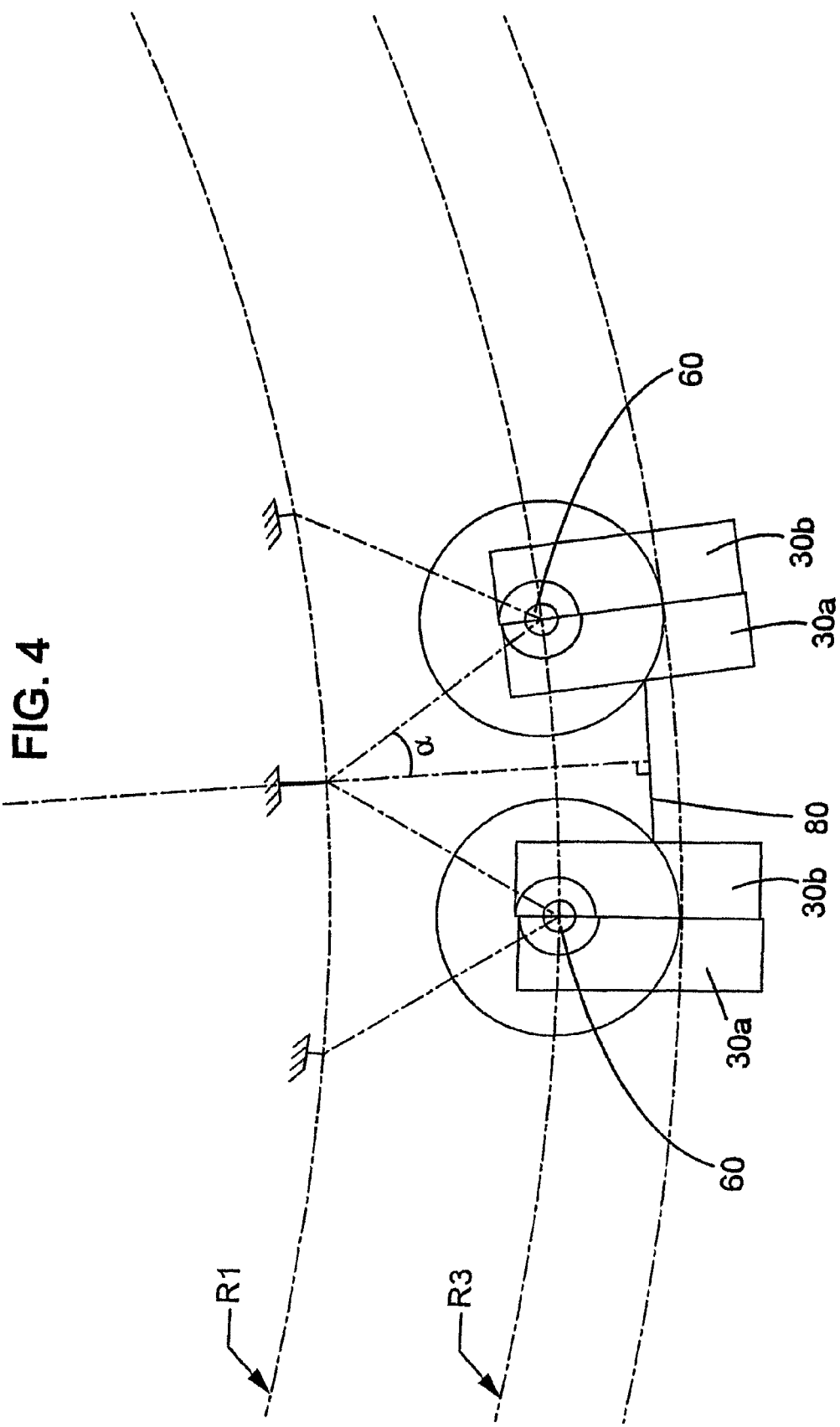

VARIABLE-PITCH MOULDING UNITS AND MOULDING MACHINE

CROSS REFERENCE TO RELATED APPLICATIONS

This application is a National Stage of International Application No. PCT/FR2006/001588 filed on Jul. 4, 2006, claiming priority based on French Patent Application No. 0507388, filed Jul. 11, 2005, the contents of all of which are incorporated herein by reference in their entirety.

TECHNICAL FIELD

The present invention relates to the technical field of moulding, blow-moulding or stretch-blow moulding machines.

BACKGROUND ART

In a blow-moulding machine, the container blank is a previously injected preform.

It is known to manufacture containers, in particular bottles, from thermoplastic materials such as for example polyethylene terephtalate (PET), by stretch-blow moulding of preforms placed inside a mould, the moulding cavity of which is in the shape of the recipient to be obtained.

To this end, preforms having the shape of a cylindrical tube closed at one end and the other end of which is open, constituting the mouth of the bottle to be obtained, are raised, in a thermal conditioning station, to a temperature such that they can be shaped.

The hot preforms are then transferred into a mould constituted by two assembled half-moulds where they are stretched and blown, the blowing being carried out by means of a pressurized gaseous fluid, generally air.

The pressures used during the blowing frequently reach 40 bars. As a result, during manufacture of a bottle of 1.5 liter capacity which has a projected area of approximately 250 cm², a force of the order of 9.800 decanewtons tends to separate the two assembled half-moulds which constitute the blowing mould.

The applicant's document FR 2793722 discloses an example of a carousel type blow-moulding machine comprising a combined "clamshell" closing and locking mechanism of a moulding unit.

The attached FIG. 1 illustrates this prior art diagrammatically. Two mould supports 1 are articulated to a base 2, integral with a rotor driven rotatably about a shaft 3.

The rotor comprises several identical moulding units distributed in angular fashion about the rotation axis 3.

In the open position, the mould is open radially to the outside and the container blank can be engaged between the two half-moulds, i.e. along the axis 4 of the mould, i.e. in a direction oriented substantially radially from the outside toward the inside.

The moulding unit is opened by pulling the supports 1 radially toward the inside of the carousel.

For this purpose, the moulding unit comprises a slider 5 which slides on the base 2 in a radial direction between a retracted opening position and a forward closing position.

Each moulding unit is provided with two connecting rods 6. Each connecting rod 6 connects a support 1 in articulated fashion to the slider 5.

In the closed position of the moulds, the orientation of the connecting rods 6 is substantially perpendicular to the joining plane of the two half-moulds.

In the closed position of the moulds, the orientation of the connecting rods 6 is substantially perpendicular to the radial direction of sliding movement of the slider 5.

The slider 5 is moved between its forward and retracted positions by a device which combines on the one hand an actuator 7 such as a double-action jack and on the other hand a cam device 8 and cam follower 9.

The actuator 7 is oriented radially with respect to the rotor of the machine. The piston 10 of the actuator 7 is always at the same distance from the rotation shaft of the rotor, while the body 11 of the actuator 7 is capable of tracking the radial movements of the slider 5.

The slider 5 carries the roller 9 which is mounted rotatable about a vertical axis and cooperates with the fixed cam 8 provided on part of the periphery of the rotor.

The cam 8 is arranged radially to the outside with respect to the roller 9. It thus comprises a circular central section 12 of which the axis is identical to that of the shaft 3 of the rotor and which has a radius RI.

On each side of the rotor, an engagement section 13 and a disengagement section 14 are provided.

The engagement section 13 is situated before the central section 12 on the trajectory of the rotor, thus that of the roller 9.

The engagement section 13 makes it possible to bring the roller 9 radially inwards from a radius R2, which is greater than the radius RI and which corresponds to the forward closure position of the slider 5, down to the radius R1 which corresponds to the opening position of the slider 5.

In the following paragraphs of the description of the state of the art, the above mentioned actuator 7 will be a double-action jack.

The cam 8 extends in total only over a sector of approximately 90° about the rotation axis 3 of the rotor.

When the moulding unit in question is not opposite the cam 8, the jack 7 is fed with fluid so that the slider 5 is pushed towards the outside of the carousel, causing the two half-moulds to close against each other.

Just before the blow moulding unit arrives opposite the cam 8, the two chambers of the jack 7 are fed at the same fluid pressure.

Thus, when the roller 9 makes contact with the engagement section 13 of the cam 8, the force exerted by the jack 7 is weak enough to allow the cam 8 to push back the slider 5 towards the inside of the carousel without causing a significant jerk.

The compression of the air contained in the outside chamber of the jack 7 must be such that the jack continues to exert a degree of force on the slider 5, in order to hold the roller 9 onto the cam 8 without it rebounding.

When the roller 9 reaches the central section 12 of the cam 8, the slider 5 has reached its most retracted position and the moulding unit is completely open.

When the roller 9 reaches the disengagement section 14 of the cam 8, the force exerted by the jack 6 must be kept sufficient to ensure that the slider 5 is brought radially outwards and the resultant closing movement of the moulding unit proceeds smoothly without excessive force.

When the roller 9 has passed the end of the disengagement section 14, the moulding unit is then in the closure position and it is then possible to feed only the outside chamber of the jack 7 to avoid any recoil of this jack 7.

The machine described in the document FR 2793722 is perfectly satisfactory but nevertheless does have drawbacks.

Firstly, the movements of the slider 5 which govern the clamping force of the moulds, as well as their opening/closing, depends in particular on the operating pressure in the jack 7. It is difficult to control the pressures in each jack 7 during the rotation of the moulding units.

Secondly, the configuration of the machine disclosed in the document FR 2793 722, is not compact.

The document FR 2 825 659 describes a carousel of an injection moulding or blow moulding machine as shown in FIG. 2.

Each half-mould 1', 1" is articulated by means of a connecting rod 3a, 3b to a part 4a, 4b which is mounted pivotable about a shaft 5a, 5b.

The pivoting parts 4a, 4b are each rotated by an actuating rod 6a, 6b articulated by its ends respectively to said piece 4a, 4b and to a translatory carriage.

A translatory movement of the carriage, using the rods 6a, 6b, causes the parts 4a, 4b to pivot and thus the moulds to open or close by the action of the connecting rods 3a, 3b on the half-moulds 1', 1", the pivot shafts 20, 5a and 5b being fixed with respect to the movement of the carriage 7.

To actuate the carriage, a push-pull rod 21, articulated on the one hand to said carriage and on the other hand to a link 22 which is mounted pivotable about a shaft 23 and which is provided with a shaft roller 23. The roller is intended to cooperate with a cam 24, in order to open and close the moulds.

The structure described in the document FR 2825659 is not compact. The applicant has endeavoured to resolve the problems mentioned above.

SUMMARY OF THE INVENTION

To this end, the invention relates, according to a first feature, to an assembly comprising moulding units for polymers.

By moulding unit is meant both injection moulding units and blow-moulding or stretch-blow moulding units.

These units are arranged one after the other in a mobile line, for example in an endless circuit, and in particular in a carousel machine.

Each of said moulding units comprises at least one mould, this mould comprising two parts which are mobile with respect to each other about an articulation shaft.

The movement of these two mould parts with respect to each other takes place during the opening and closing of the mould.

The assembly comprises rollers cooperating with a cam, each of said rollers being connected by links to the two articulation shafts of contiguous moulding units.

The trajectory described by the rollers against the cam and the trajectory described by the articulation shafts are brought closer to each other on a predetermined course of the moulding units, such that the distance between the articulation shafts of the contiguous moulding units is increased over this course.

Thus an assembly comprising variable-pitch moulding units is obtained.

According to various embodiments the assembly has the following characteristics, combined if appropriate.

The rollers follow a trajectory having a substantially fixed radius of curvature, and the articulation shafts of the moulds follow a trajectory moving closer to that of the rollers.

The articulation shafts follow a trajectory having a substantially fixed radius of curvature, and the rollers follow a trajectory moving closer to that of the articulation shafts.

The two mobile parts of the moulding units are mould carriers, or each form a half-mould, the two half-moulds being articulated to each other about said articulation shaft.

Each mould carrier or each half-mould of a moulding unit is connected by a link or an articulated joint to a mould carrier or a half-mould of a contiguous moulding unit.

According to a second feature, the invention relates to a machine for moulding, blow-moulding, or stretch-blow moulding of containers from thermoplastics, in particular PET, PEN, this machine comprising at least one assembly as described above.

In a particular embodiment, the moulding units are blow-moulding units mounted mobile in rotation about a shaft of a substantially vertical carousel, each one of said blow-moulding units comprising two substantially identical mould supports, these supports being mounted articulated to each other about a substantially vertical articulation shaft, the rollers cooperating with a track, each of said rollers being connected by links to the two articulation shafts of the contiguous moulding units, the trajectory described by the rollers against the track and the trajectory described by the articulation shafts being brought closer to each other over a predetermined course of the moulding units, such that the distance between the articulation shafts of the contiguous moulding units is increased over this course.

In an embodiment, the rollers follow a substantially circular trajectory of radius $R_1$ with respect to the shaft of the carousel, the articulation shafts following a substantially circular trajectory of radius $R_3$ with respect to the shaft of the carousel.

For a predetermined angular course value of the carousel, the rollers or the articulation shafts follow a trajectory of radius of curvature $R_2$ comprised between $R_1$ and $R_3$, this radius of curvature being in particular fixed.

In a particular embodiment, the radii of curvature $R_1$ and $R_2$ are defined by a cam path provided with a substantially vertical plane of symmetry.

BRIEF DESCRIPTION OF THE DRAWINGS

Other subjects and advantages of the invention will become apparent from the following description of embodiments which will be given with reference to the attached drawings in which:

FIG. 4 is a detailed view of a variant implementation.

DESCRIPTION OF THE PREFERRED EMBODIMENT OF THE INVENTION

Figure 1:
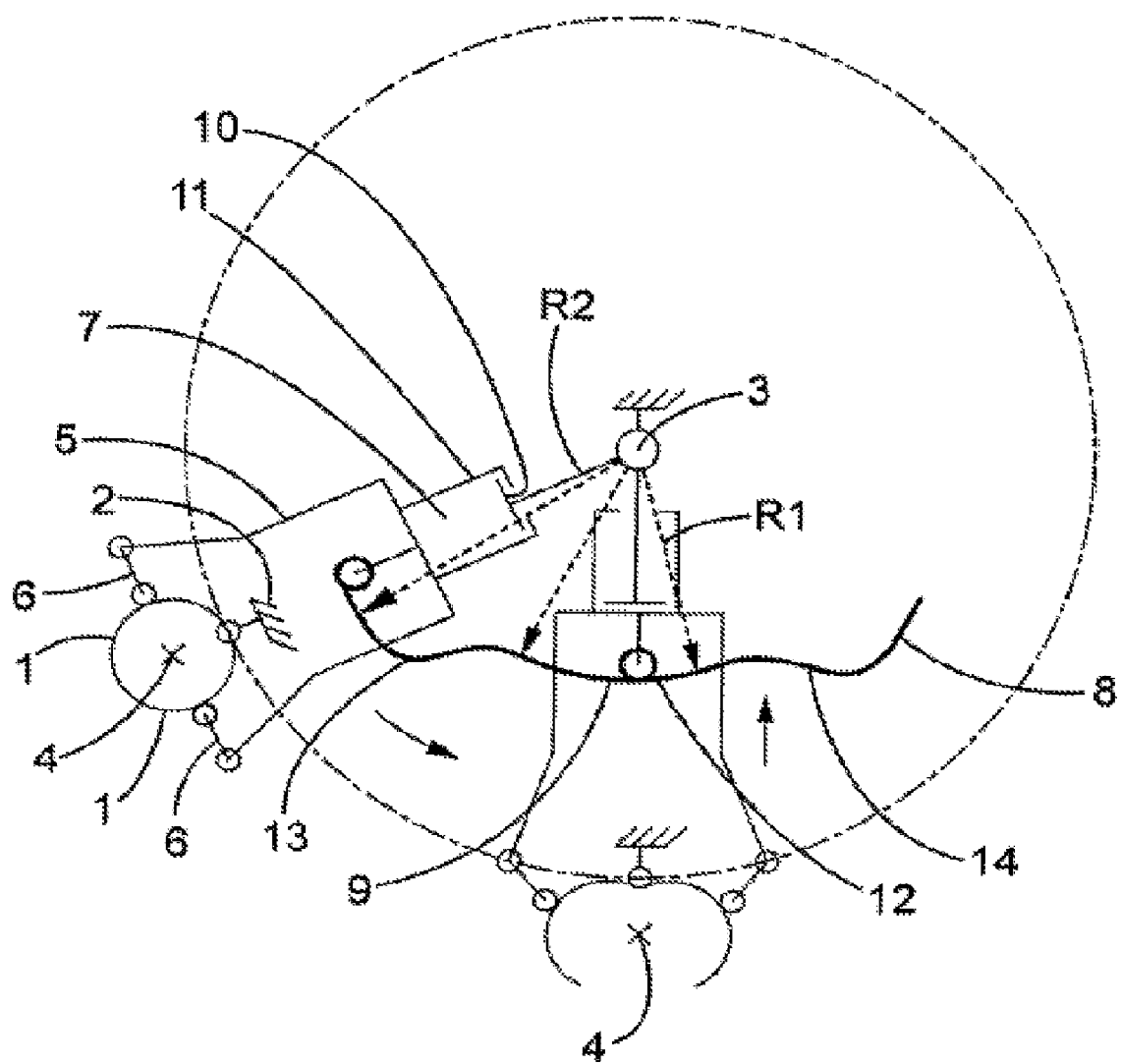
FIGS. 1 and 2 are views of machines proposed in the prior art.
Figure 2:
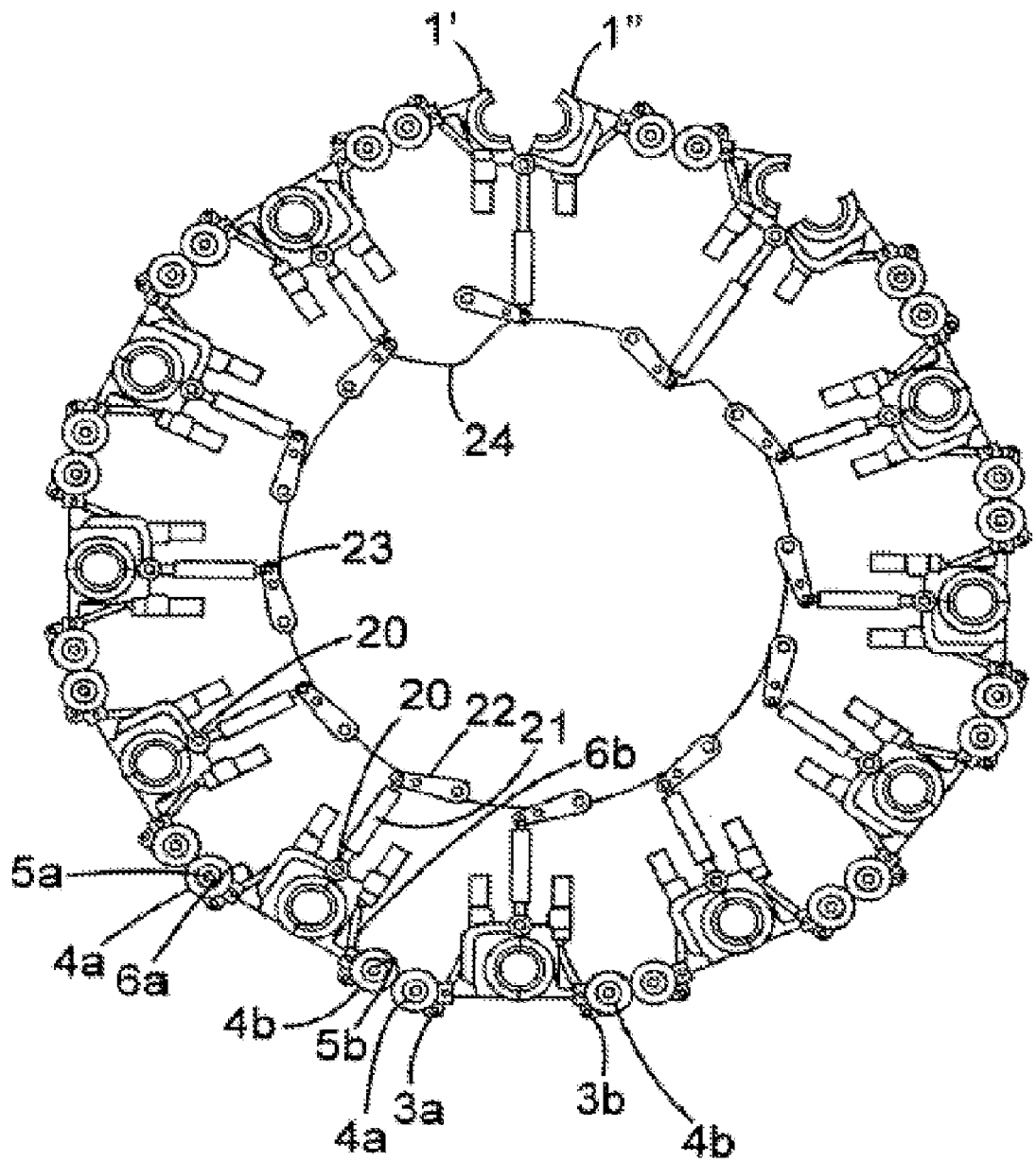
Figure 3:
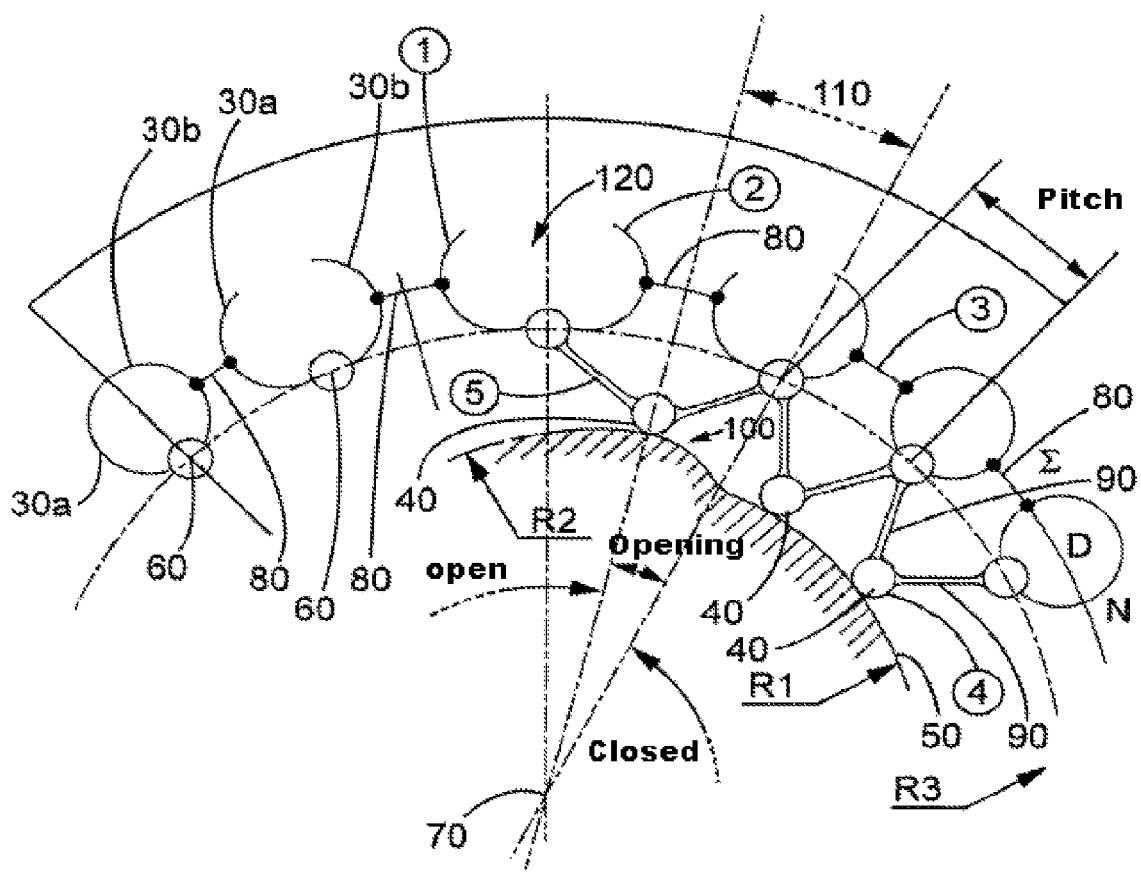
FIG. 3 is a diagram of the principle of a machine according to the invention, provided with means for spacing the moulds and for asymmetrical opening/closing of the moulds.

The mould supports 30a, 30b are shown diagrammatically in FIG. 3. These mould supports are each intended to carry a half-mould (not shown).

In the embodiment of FIG. 3, the mould supports have substantially the form of a half-tube so as to receive semi-cylindrical moulds.

For each mould unit, the two supports 30a, 30b are articulated between a closed position and opening positions.

In the closed position, the supports 30a, 30b define a substantially cylindrical internal space such that the half-moulds that they carry rest against each other by their respective joining plane faces.

Each moulding (or blow-moulding, stretch-blow moulding) unit is connected to a roller 40 or guide shoe.

The roller 40 cooperates with a cam path 50, or a guide rail curve or a track.

For each moulding unit, the supports 30a, 30b or mould carriers are articulated to each other about a shaft 60.

During the rotation of moulding units about the shaft 70 of the carousel, the axes 60 of articulation of the mould carriers 30a, 30b have a substantially circular course of radius R3 about the central shaft 70 of the carousel.

Each support 30a, 30b of a given first moulding unit is connected by an articulated link 80 to the closest support of a second contiguous moulding unit.

In an embodiment, the links 80 are replaced by articulation shafts connecting the directly adjacent supports of the contiguous moulding units.

Each articulation shaft 60 of the supports 30a, 30b is connected to two rollers 40 or guide shoes by links 90.

When the rollers 40 or guide shoes circulate against a first part in an arc of a circle of radius R1 of the cam path 50, the moulding units are closed and equidistant by a predetermined pitch.

When the rollers 40 meet the engagement section 100, as the radial position of the articulation shaft 60 on the radius R1 is fixed and the links 90 are rigid, the moulding units will move apart.

Thus a variation of the pitch between moulding units is obtained.

As the articulation shafts 60 of the supports 30a, 30b follow a circular course of radius R1 and the contiguous supports 30a, 30b are connected by rigid links 80, the separation of the moulding units is achieved simultaneously with the separation of the supports 30a, 30b, allowing the moulds to open.

As shown in FIG. 3, the opening of the moulds is asymmetrical. In fact, while one of the supports of a mould entering the opening zone 110 is still held by a first link 80 to a mould which is not open, the other support is connected by a second link 80 to an open mould 120.

This asymmetrical opening is advantageous.

In the blow-moulding carousel devices currently in use, the two half-moulds open substantially symmetrically on each side of the jointing plane, these jointing planes being substantially radial.

In these known devices, the means of inserting blanks and the means of extracting bottles are arranged in the form of rotating transfer wheels equipped with grippers supported by approximately radial arms. Each gripper must accompany the mould over a portion of its rotation trajectory, with in addition:
  a movement with a radial component for entering the mould
  a movement with a radial component for exiting the mould;
    these gripper movements having to be carried out without interfering physically with the edges of the half-moulds, the blank and the container.

The result is a relatively complex arrangement of the means of introduction and the means of extraction.

By implementing a structure such as shown in FIG. 3, it is possible to obtain an asymmetrical opening of the moulds. For a blow-moulding machine, it is thus possible to reduce the time for the insertion of blanks and release of the bottles.

The structure shown in FIG. 3 moreover makes it possible to use gripper means having a simplified structure, as shown for example in the document FR 05 01269 of the applicant.

The implementation of asymmetrically-opening moulds has also been described in this document FR 05 01269.

In the variant embodiment of FIG. 4, the mould carrier units or supports 30a, 30b are still connected together by links 80.

The articulation shafts 60 no longer follow a fixed circular course, but a cam path similar to the one numbered 40 in FIG. 3. The rollers 40 then follow a circular path of fixed radius R1.

The invention offers numerous advantages.

Some of these advantages are given below, the order in which they are listed not necessarily reflecting their relative importance, which can vary according to the applications envisaged for the machine.

Firstly, the compactness of the machine is increased. The moulding units are separated from each other only in the zones where this separation is useful, i.e. the zones of opening and closing of the moulds.

Secondly, as the opening of the moulds is asymmetrical, the separation of the moulds in the opening and closing zones is less than in conventional machines with an acute angle of opening or symmetrical opening of the moulds.

Thirdly, as the opening of the moulds is asymmetrical, it is possible to use means of gripping blanks and bottles that have a simpler structure and higher operating speeds.

Fourthly, the moulds can be removed independently of each other for maintenance.

Fifthly, the conventional means of locking the moulds can be avoided, in particular when the internal pressure of the moulds is not very high. As this locking phase corresponds to an angular course of the carousel, this results in a greater productivity.

The invention claimed is:

1. Assembly comprising moulding units for polymers, these units being arranged one after the other in a mobile line, each of said moulding units comprising a mould, this mould comprising two parts mobile with respect to each other about an articulation shaft, the movement of these two parts with respect to each other taking place during the opening and closing of the mould, wherein the assembly comprises rollers cooperating with a cam, each of said rollers being connected by links to the two articulation shafts of contiguous moulding units, the trajectory described by the rollers against the cam and the trajectory described by the articulation shafts being brought closer to each other on a predetermined course of the moulding units, so that the distance between the articulation shafts of the contiguous moulding units is increased over this course.

2. Assembly according to claim 1, wherein the rollers follow a trajectory having a substantially fixed radius of curvature.

3. Assembly according to claim 1, wherein the articulation shafts follow a trajectory having an approximately fixed radius of curvature.

4. Assembly according to claim 1, wherein the moulding units form part of a carousel.

5. Assembly according to claim 1, wherein the two mobile parts of the moulding units are mould carriers.

6. Assembly according to claim 1, wherein the two mobile parts of the moulding units each comprise a half mould, the two half-moulds being articulated to each other about said articulation shaft.

7. Assembly according to claim 5, wherein each mould carrier or each half mould of a moulding unit is connected by a link or an articulated joint to a mould carrier or a half mould of a contiguous moulding unit.

8. Moulding, blow-moulding or stretch-blow moulding machine for containers made of thermoplastics, in particular PET, this machine comprising at least one assembly such as claimed in claim 1.

9. Machine according to claim 8, wherein the moulding units are blow-moulding units mounted mobile in rotation about a shaft of a substantially vertical carousel, each of said blow-moulding units comprising two substantially identical mould supports, these supports being mounted articulated to each other about a substantially vertical articulation shaft, the rollers cooperating with a track, each of said rollers being connected by links to the two articulation shafts of contiguous moulding units, the trajectory described by the rollers against the track and the trajectory described by the articulation shafts being brought closer to each other over a predetermined course of the moulding units, so that the distance between the articulation shafts of the contiguous moulding units is increased over this course.

10. Machine according to claim 9, wherein the rollers follow a substantially circular course of radius R1 with respect to the shaft of the carousel.

11. Machine according to claim 9, wherein the articulation shafts follow a substantially circular trajectory of radius R3 with respect to the shaft of the carousel.

12. Machine according to claim 11, wherein, for a predetermined angular course value of the carousel, the rollers or the articulation shafts follow a trajectory of radius of curvature R2 comprised between R1 and R3.

13. Machine according to claim 12, wherein the radii of curvature R1 and R2 are defined by a cam path provided with a substantially vertical plane of symmetry.

* * * * *